UNITED STATES PATENT OFFICE.

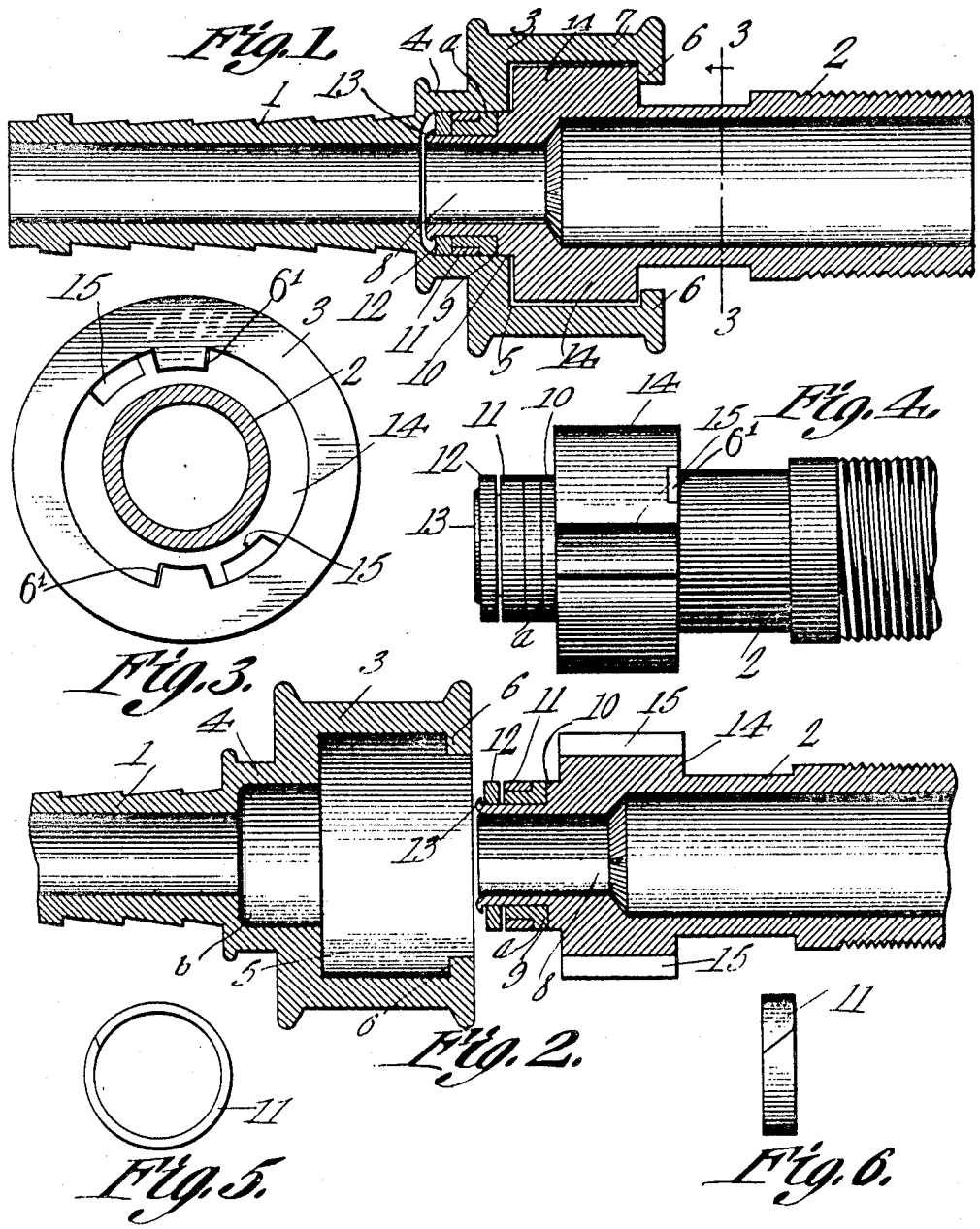

HARRY B. ROBINSON, OF MUSKEGON, MICHIGAN.

HOSE-COUPLING.

1,099,129.

Specification of Letters Patent.

Patented June 2, 1914.

Application filed October 12, 1912. Serial No. 725,549.

*To all whom it may concern:*

Be it known that I, HARRY B. ROBINSON, a citizen of the United States, residing at Muskegon, in the county of Muskegon and State of Michigan, have invented a new and useful Hose-Coupler, of which the following is a specification.

The present invention relates to improvements in hose couplers, the primary object of the invention being the provision of a novel form of coupler, in which the female member is provided with a reduced gasket receiving portion for the gasket carried by the male member, the male and female members being provided with co-acting means for permitting the registration of the male member with the female member, and for locking the members against leakage, a split expansible gasket being carried by the male member to be forced by frictional contact into the reduced portion of the female member and there locked against movement and to prevent leakage between the members, said expansible gasket also being held in close contact by the pressure fluid and thus automatically tightened to prevent leakage of the coupling.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a longitudinal sectional view through the coupling with the parts in locked position. Fig. 2 is a similar view with the parts detached. Fig. 3 is a section taken on line 3—3 of Fig. 1. Fig. 4 is an elevation of the male member taken from the slotted side of the head thereof. Figs. 5 and 6 are detail views of the split metal gasket *per se*.

Referring to the drawings, the numeral 1 designates the female member, and 2 the male member, either member being disposed for connection to a hose or to a hydrant as may be necessary, the female member being provided with the enlarged chambered head 3 terminating in a reduced gasket receiving head 4, which is provided with a rounded portion $b$. The enlarged chamber 5 of the head of the female member constitutes a receptacle for the locking portion of the male member as will presently appear, two lugs 6 being formed integral with the female member.

The male member is provided with the reduced end 8 having the external annular shoulder 9 terminating in the concentric portion 10, and disposed upon the reduced end exteriorly of the shouldered portion 9 is a grooved band $a$ having mounted upon and within the groove, the split resilient gasket or ring 11, the outer circumference of which contacts the walls of the chamber 4 to form a water tight joint with the walls of the chamber 4 of the female member when the parts are assembled as shown in Fig. 1. The gasket 11 which is preferably made of metal, is locked in proper position by means of the slidable metal ring 12, the same constituting a means to prevent the loss of the gasket 11 and thus lock the same in position, the extreme end of the reduced portion 8 of the member 2, being spun as at 13 to form a circumferential shoulder to hold the locking ring 12 in place. This spun portion may be replaced with a lock nut if so desired. The members, when assembled, as in Fig. 1, provide a space at $b$, whereby water under pressure abuts the ring 12 and forces it against the gasket 13, to automatically seal the joint at this point, the greater the pressure the tighter the joint thus formed.

The enlarged head 14 of the male member is disposed for positioning within the chamber 5 of the female member and is provided with the diametrically disposed grooves 15 at two points of the circumference thereof and which are disposed to register with the lugs 6 when the members are connected and disconnected.

The outer face of the head 14 is beveled to provide a means when either one of the members are rotated to place the slots 15 out of registration with the lugs 6, to engage the inner face of the lugs 6 and thus project the male member tightly within the female member, so that the split gasket 11 will be forced into the chamber 4 of the member 1 to be locked therein and thus form a water tight joint between the two members.

From the foregoing description, taken in connection with the drawings, it is evident that by positioning the yielding gasket 11 upon the reduced end 8 as shown, that the same will be held against outward movement, so that when the members are in interlocked relation, the outer circumference of the gasket 11 will abut the inner wall of the chamber 4 and thus form the necessary tight joint therebetween. Should the gasket 11 due to wear and other causes become useless, the same may be readily removed and a new one placed upon and around the grooved ring a.

The retaining ring 12 is a loose fit upon the reduced end 8, and is held against outward movement by means of the spun rim 13, thus providing a means whereby the retaining ring 12 may slide up against the ends of the gasket 11 and ring a when pressure is turned on, thus making a perfectly tight joint. By means of the shoulders 9 and 10, the washer 11 is properly held in shape and against blowing or bulging out when placed in proper locked relation to the female member. The lugs 6 of the female member when the parts are interlocked, fit in the recesses 6' of the male member and thus the parts are locked against accidental rotation and disengagement and are held so locked by the water pressure entering as indicated by the arrows, Fig. 1. It will thus be seen that after the coupling is assembled as shown in Fig. 1, and the water is permitted to flow in the direction of the arrows, that the ring 12 due to the impingement of the water thereagainst will force the gasket 11 into close engagement with the adjacent portion of the female member of the coupling and that therefore the coupling will automatically seal itself and not necessitate the employment of springs or other objectionable features as is usual in couplings of this character.

What is claimed is:

1. A device of the class described comprising right and left hand coupling members, the said left hand coupling member provided with a cylindrical gasket receiving chamber, the said right hand member provided with a reduced end relatively smaller in diameter than the gasket receiving chamber of the left hand member, coacting means carried by the right and left hand members adapted to lock the said members with the reduced portion of the right hand member within the gasket receiving chamber of the left hand member, the reduced end of the right hand member provided with a grooved band slidably mounted thereon, a split resilient gasket removably positioned within the open ended groove of the said band, a metallic locking ring slidably disposed upon the reduced portion of the right hand member adapted to move against the said gasket and band, the extreme end of the reduced portion of the right hand member provided with a circumferential shoulder holding the said locking ring in place, the said locking ring, grooved band and gasket engaging the side walls of the gasket receiving chamber of the left hand member and effecting a liquid-tight juncture therewith.

2. A device of the class described comprising right and left hand members, the left hand member provided with a bore extending longitudinally therethrough and with means juxtaposed the end thereof for securing a liquid conduit thereto, said left hand member provided with co-axial chambers of different diameters, the outermost chamber providing locking means, the adjacent chamber forming a gasket receiving bore effecting a liquid-tight juncture with the right hand member, the said right hand member provided with a longitudinal bore extending therethrough and with means adjacent the end thereof for securing the same to a liquid conduit, the remote end of the said right hand member provided with an enlarged annular flange intermediate its ends and with a reduced end, said enlarged annular flange provided with longitudinal grooves extending thereacross, means carried by the outermost chamber of the left hand member for receiving the annular flange of the right hand member therein and interlocking therewith, and a grooved band fitting upon the reduced end of the right hand member, a gasket fitting within the open end of the said groove, and a locking ring slidably positioned upon the reduced end contacting with the end of said gasket and grooved band adapted to force the same into contact with the shoulder marking the limit of the reduced end of the right hand member and adapted to expand the same into contact with the gasket receiving chamber of the left hand member, and the reduced end of the right hand member provided with an outlying shoulder locking the said ring in place thereon.

In testimony that I claim the foregoing as my own, I have hereto affixed my signature in the presence of two witnesses.

HARRY B. ROBINSON.

Witnesses:
 CLARA EBERHARDT,
 BENJ. H. TILLMAN.

---

Copies of this patent may be obtained for five cents each, by addressing the "Commissioner of Patents, Washington, D. C."